United States Patent
Schedelbeck et al.

(10) Patent No.: US 9,686,045 B2
(45) Date of Patent: Jun. 20, 2017

(54) DATA TRANSMISSION AND RETRANSMISSION

(75) Inventors: Gert Schedelbeck, Munich (DE); Bernd Heise, Munich (DE)

(73) Assignee: Lantiq Beteiligungs-GmbH & Co. KG, Neubiberg (DE)

( * ) Notice: Subject to any disclaimer, the term of this patent is extended or adjusted under 35 U.S.C. 154(b) by 760 days.

(21) Appl. No.: 11/696,515

(22) Filed: Apr. 4, 2007

(65) Prior Publication Data
US 2008/0248758 A1    Oct. 9, 2008

(51) Int. Cl.
*H04L 1/16* (2006.01)
*H04L 1/18* (2006.01)
*H04L 1/00* (2006.01)

(52) U.S. Cl.
CPC .......... *H04L 1/1614* (2013.01); *H04L 1/1635* (2013.01); *H04L 1/1874* (2013.01); *H04L 1/0057* (2013.01); *H04L 1/0071* (2013.01)

(58) Field of Classification Search
None
See application file for complete search history.

(56) References Cited

U.S. PATENT DOCUMENTS

| | | | | |
|---|---|---|---|---|
| 6,370,153 B1* | 4/2002 | Eng | | 370/438 |
| 6,473,399 B1* | 10/2002 | Johansson et al. | | 370/229 |
| 6,694,471 B1* | 2/2004 | Sharp | | 714/749 |
| 6,810,488 B2 | 10/2004 | Teng | | |
| 6,816,478 B1* | 11/2004 | Laroia et al. | | 370/349 |
| 6,859,442 B1* | 2/2005 | Agarwal et al. | | 370/316 |
| 7,000,021 B1 | 2/2006 | Radhakrishnan et al. | | |
| 7,020,826 B2 | 3/2006 | Litwin, Jr. et al. | | |
| 7,076,717 B2 | 7/2006 | Grossman, IV et al. | | |
| 7,103,025 B1 | 9/2006 | Choksi | | |
| 7,106,742 B1* | 9/2006 | Frisch et al. | | 370/394 |
| 7,236,787 B1 | 6/2007 | Tamura et al. | | |
| 7,305,486 B2* | 12/2007 | Ghose et al. | | 709/232 |
| 2002/0131455 A1* | 9/2002 | Cioffi et al. | | 370/503 |
| 2002/0159520 A1 | 10/2002 | Choi et al. | | |
| 2003/0014709 A1 | 1/2003 | Miyoshi et al. | | |
| 2003/0026247 A1* | 2/2003 | Bernstein | | 370/352 |
| 2003/0098804 A1* | 5/2003 | Ekstrand et al. | | 341/107 |
| 2003/0115331 A1* | 6/2003 | Xie et al. | | 709/227 |

(Continued)

FOREIGN PATENT DOCUMENTS

| | | |
|---|---|---|
| JP | 5145594 | 6/1993 |
| JP | 2002198938 | 7/2002 |

(Continued)

OTHER PUBLICATIONS

Network Interface, Power, and Protection (NIPP) Committee, Network Access Interfaces (NAI) Subcommittee, "A DSL Physical-Layer Retransmission Scheme," Huawei Technologies Co., Ltd., 33 (VDSL2), pp. 7 (Feb. 12-15, 2007).

(Continued)

*Primary Examiner* — Hicham Foud
(74) *Attorney, Agent, or Firm* — Eschweiler & Associates, LLC (57) ABSTRACT

A method transmits data. The method includes transmitting a series of data unit, receiving a retransmission request indicating a plurality of corrupt data units in the transmitted data units which were not received correctly, and retransmitting the corrupted data units.

18 Claims, 6 Drawing Sheets

(56) References Cited

U.S. PATENT DOCUMENTS

| | | | |
|---|---|---|---|
| 2004/0009786 A1* | 1/2004 | Terry | 455/522 |
| 2004/0068686 A1 | 4/2004 | Palm | |
| 2004/0148396 A1* | 7/2004 | Meyer et al. | 709/227 |
| 2004/0156366 A1* | 8/2004 | Walls et al. | 370/394 |
| 2005/0036452 A1* | 2/2005 | Banerjee et al. | 370/252 |
| 2005/0054319 A1* | 3/2005 | Tamaki et al. | 455/296 |
| 2005/0169199 A1* | 8/2005 | Futenma et al. | 370/282 |
| 2005/0201339 A1* | 9/2005 | Mangin et al. | 370/337 |
| 2005/0226239 A1* | 10/2005 | Nishida et al. | 370/389 |
| 2005/0276249 A1* | 12/2005 | Damnjanovic et al. | 370/335 |
| 2006/0062173 A1* | 3/2006 | Cheng et al. | 370/328 |
| 2006/0083323 A1 | 4/2006 | DesJardins et al. | |
| 2006/0133290 A1* | 6/2006 | Lindoff et al. | 370/252 |
| 2006/0256803 A1 | 11/2006 | Nakata et al. | |
| 2007/0141991 A1* | 6/2007 | Hong et al. | 455/63.1 |
| 2007/0147335 A1* | 6/2007 | Ido et al. | 370/349 |
| 2007/0260965 A1 | 11/2007 | Schmidt et al. | |
| 2008/0062872 A1* | 3/2008 | Christiaens et al. | 370/231 |
| 2008/0165804 A1 | 7/2008 | Thyagarajan | |
| 2009/0013088 A1* | 1/2009 | Harada | 709/232 |
| 2010/0046370 A1* | 2/2010 | Ghose et al. | 370/235 |

FOREIGN PATENT DOCUMENTS

| | | |
|---|---|---|
| JP | 200586594 | 3/2005 |
| JP | 2006245912 | 9/2006 |
| WO | 8605339 | 9/1986 |
| WO | 9848528 | 10/1998 |
| WO | 2006104104 | 10/2006 |

OTHER PUBLICATIONS

ITU-Telecommunication Standardization Sector, Study Group 15, "G.gen: VDSL: ADSL Retransmission Mode in DSL," Broadcom, pp. 6 (Sep. 25-29, 2006).

Network Interface, Power, and Protection (NIPP), Network Access Interfaces (NAI) Subcommittee, "Proposal for a VDSL2 Data Retransmission Protocol," Marcos Tzannes, Aware, pp. 6 (Oct. 9-12, 2005).

Network Interface, Power, and Protection (NIPP), Network Access Interfaces (NAI) Subcommittee, "Retransmission for DSL PHY Layer," Broadcom1, pp. 16 (Dec. 5-7, 2006).

The Final Office Action for U.S. Appl. No. 11/651,923 mailed Apr. 26, 2010 (18 pages).

The Office Action for Patent U.S. Appl. No. 11/651,923 mailed Sep. 22, 2009 (20 pages).

The Japanese Office Action for Patent Application No. 2008-001912 mailed Jun. 22, 2010 (3 pages)(with Translation 5 pages).

* cited by examiner

DATA TRANSMISSION AND RETRANSMISSION

BACKGROUND

Data transmission typically includes a data transmitter having a transmission circuit configured to transmit a series of data units. A corresponding data receiver typically includes a receiver circuit configured to receive the transmitted series of data units. Problems exist as to how to handle corrupt data units not received correctly by the data receiver.

For this and other reasons, there is a need for the present invention.

SUMMARY

One embodiment provides a method of transmitting data. The method includes transmitting a series of data unit, receiving a retransmission request indicating a plurality of corrupt data units in the transmitted data units which were not received correctly, and retransmitting the corrupted data units.

BRIEF DESCRIPTION OF THE DRAWINGS

The accompanying drawings are included to provide a further understanding of the present invention and are incorporated in and constitute a part of this specification. The drawings illustrate embodiments and together with the description serve to explain the principles of the embodiments. Other embodiments and many of the intended advantages embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is also to be understood that in the following description of exemplary embodiments any direct connection or coupling between functional blocks, devices, components or other physical or functional units illustrated in the drawings or described herein could also be implemented by an indirect connection or coupling. In particular, it should be appreciated that any data connection between functional devices or units, such as between a transmitter and a receiver or between two transceivers, may be implemented as a physical link, such as a wire or line, or as a wireless connection.

It is also to be understood that the features of various exemplary embodiments described herein may be combined with each other unless specifically noted otherwise.

Figure 1:
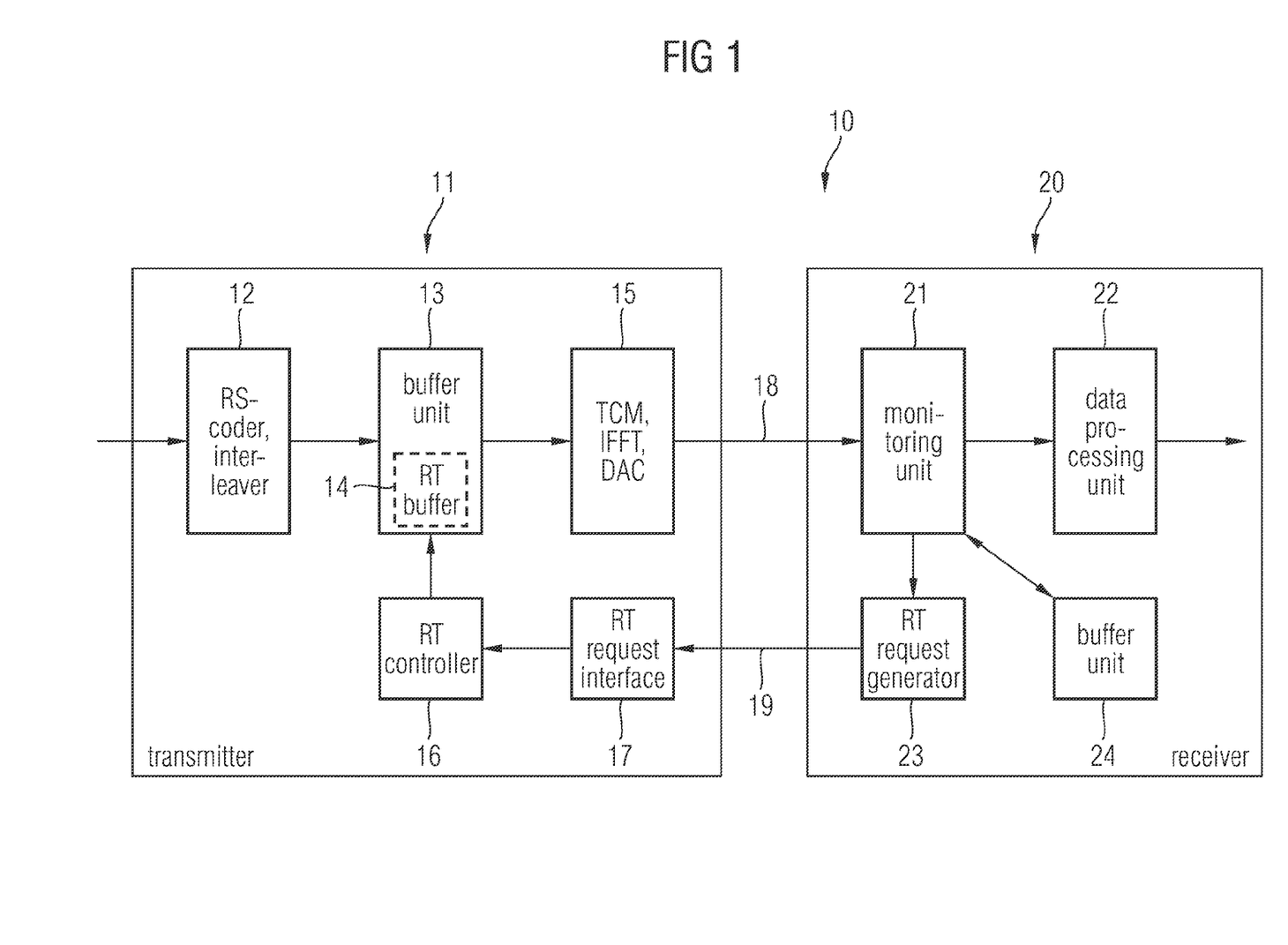
FIG. 1 is a block diagram of a transmission system according to an embodiment.

FIG. 1 is a schematic block diagram of an embodiment of a transmission system 10 comprising a transmitter 11 according to an embodiment and a receiver 20 according to an embodiment. Note that while in FIG. 1 transmitter 11 and receiver 20 are depicted as embodiments, other embodiments are designed as transceivers combining the functionalities and elements of transmitter 11 and receiver 20 or of other transmitters and receivers of embodiments.

As is explained in detail below, the transmission system 10 of the embodiment of FIG. 1 provides error protection capabilities.

Error protection capability, in this respect, generally relates to the capability of a communication device like a transmitter, a receiver or a transceiver to correct or compensate errors during transmission. Such errors for example may occur if a communication path, like a wire or a path used for wireless transmission, is subjected to electromagnetic radiation, for example generated by other electronic devices.

The embodiment of FIG. 1 illustrates a transmission system using Reed-Solomon coding combined with interleaving and retransmission of erroneous or corrupted data to provide such error protection capabilities. The provision of Reed-Solomon coding and interleaving in embodiments is optional, and error protection capabilities may also be provided by only using retransmission which is explained below in greater detail.

Reed-Solomon coding is a technique which uses redundancy to be able to recover, in case of a partial loss or corruption of transmitted data, the complete transmitted data. Increased redundancy gives an increased capability to recover lost or corrupted data, but also lowers the possible data rate since more redundant data has to be transmitted. Interleaving, on the other hand, basically changes the order in which data units, for example packets, cells, data frames or the like, are sent such that it is less likely that a number of consecutive data units which is greater than the number recoverable for example using Reed-Solomon encoding is destroyed by any temporal disturbance of a corresponding communication link. Some variants of Reed-Solomon coding like cross-interleaved Reed-Solomon coding imply interleaving. In such a case, a further interleaver may be provided in embodiments. In other embodiments, other forward-error correction techniques besides Reed-Solomon coding may be used alternatively or additionally. In other embodiments, no such technique is used.

In the transmission system 10 embodiment of FIG. 1, data to be transmitted from transmitter 11 to receiver 20 is fed to a Reed-Solomon encoder and interleaver 12 of transmitter 11 to perform Reed-Solomon encoding and interleaving as briefly described above. The such coded and interleaved data is forwarded to a buffer unit 13 for temporal storage of the data. Buffer unit 13 on the one hand serves for temporally storing the data before the actual transmission (i.e., works as transmit buffer) and on the other hand works as retransmission buffer by storing data even after it has been sent, the function of which is explained below in greater detail. These buffer functionalities may be implemented in a single buffer which may take the form of a memory like a RAM. In other embodiments, as indicated by reference numeral 14 in FIG. 1, for storing data after transmission a separate retransmission buffer 14 may be implemented within buffer unit 13 as illustrated or external to buffer unit 13.

In the transmission system 10 of the embodiment of FIG. 1, discrete multi-tone modulation (DMT) is used for modulating the data to be sent onto a plurality of carrier frequencies. This modulation technique is, for example, used in digital subscriber line (DSL) systems. In such systems, data is transmitted in form of data frames, each data frame containing a number of bits of the data to be sent. Retransmission buffer 14 or buffer unit 13 in case no separate retransmission buffer is provided stores a predetermined number of data frames after they have been transmitted, for example the last 20 transmitted data frames or the last 100 transmitted data frames.

In general, however, embodiments may not be applied only to DMT transmission of data frames, but generally to the transmission of data in form of data units like data frames, cells, packets etc., for example transmission using an orthogonal frequency division multiplexing (OFDM).

The data frames to be transmitted are forwarded to a unit 15 which in the embodiment illustrated performs a trellis coding in order to modulate the data corresponding to the data frame to be sent onto a plurality of carrier frequencies, an inverse Fast Fourier transform to convert the frame to be sent to the time domain and a digital-to-analog converter to convert the signal thus generated to an analog signal to be transmitted via a line 18. The frames sent in this manner are also referred to as symbols. In FIG. 1 only elements necessary for the understanding of the embodiment are illustrated, and further elements like line drivers or signal processing elements may additionally be present in embodiments.

In unit 15, furthermore a frame checksum (FCS) is added to each frame, the checksum being calculated in any suitable manner based on the content of the frame. On the receiver side, a monitoring unit 21 receives the frames via line 18 and performs the complementary operations to unit 15 in the reverse order, i.e., an analog-to-digital conversion, a Fast Fourier transform and a trellis decoding. Using the frame checksum mentioned above, it evaluates whether the received frame has been received correctly or has been corrupted and stores the received frame in a buffer unit 24. In general, a frame or more general a data unit which is not received correctly is referred to as corrupt frame or data unit in the context of this application.

As long as no transmission error occurs, the frames are then forwarded to a data processing unit 22 which performs the deinterleaving, i.e., places the received data in the original order before interleaver 12, performs Reed-Solomon decoding and performs any further data processing desired.

In case the received frame is corrupt (i.e., the frame checksum does not match with the content of the frame) in case not too many frames are corrupted, a reconstruction is possible, since the embodiment of transmission system 10 illustrated uses Reed-Solomon coding and interleaving, as explained above. In this case, data processing unit 22 reconstructs the corrupt frames using the corresponding Reed-Solomon decoding and the frames stored in the buffer unit 24.

However, if in the embodiment illustrated it is not possible to reconstruct the corrupt frame, monitoring unit 21 informs retransmission request generator 23 to send a retransmission request over line 19 back to transmitter 11 in order to request the retransmission of the corrupt frame or frames, i.e., to request that the corrupt frame or frames be sent again. The retransmission request is received by a retransmission request interface 17 of transmitter 11 and forwarded to a retransmission controller 16 which then controls buffer unit 13 to forward the corresponding data to be sent again from buffer unit 13, for example from retransmission buffer 14, to unit 15 instead of the data which would be sent in case no retransmission request were received.

The handling of retransmission requests is described below in greater detail.

Note that line 18 and line 19 may be the same physical line or may be different physical lines. In other embodiments, both are wireless connections. In an embodiment, the retransmission requests use a different frequency range than the normal communication.

Furthermore, note that FIG. 1 is only a schematic diagram illustrating the elements relevant for the understanding of the embodiments, and further signal processing elements like filters, equalizers and the like may or may not be present in actual implementations, for example, between line 18 and monitoring unit 21.

In embodiments where instead of transmitter 11 and receiver 20 transceivers are employed on both sides, for example to provide DSL data communication in both directions, the retransmission requests may be sent together with the DSL payload data, for example by being modulated on predetermined frequency channels reserved for retransmission requests or by using frames having a predetermined identifier to be able to identify the frame as a retransmission request.

As explained above, while in the embodiment of FIG. 1 a Reed-Solomon coder and an interleaver is present, in other embodiments no Reed-Solomon coding or interleaving is used. In such an embodiment, when monitoring unit 21 receives a corrupt frame, it may control retransmission request generator 23 to request retransmission of the corrupt frame without first evaluating whether a recovery of the corrupt frame is possible by Reed-Solomon decoding.

In the embodiment illustrated, when a retransmission request is sent received frames are stored in buffer 24 in receiver 20 until the requested retransmitted frames are received such that the frames are then forwarded to signal processing unit 22 in the correct order.

Further possible implementations of embodiments can be realized based on the implementations illustrated in U.S. application Ser. No. 11/651,923 assigned to the same assignee as the present application and incorporated by reference herein, for example by modifying the retransmission request handling described therein as indicated by the embodiments which are described in the following.

In the following, embodiments of retransmission requests and the handling of such retransmission requests are explained in greater detail. In particular, the embodiments which will be discussed in the following take into account that also a channel used for sending the retransmission requests may be disturbed such that the retransmission requests are also corrupted. In particular, if for example lines 18 and 19 in FIG. 1 are the same physical line, a longer disturbance may act on both line 18 and 19.

As already mentioned, while FIG. 1 illustrates a DMT system, embodiments may be adapted to any kind of communication where data is sent in the form of consecutive data units. Therefore, in the following the generic term "data unit" will be used for explaining embodiments.

In order to restore the correct order of data units like the above-mentioned frames, in embodiments the data units transmitted are provided with an identifier like a sequence ID (SID), for example a number which increments by one with each frame.

Figures 2, 3:
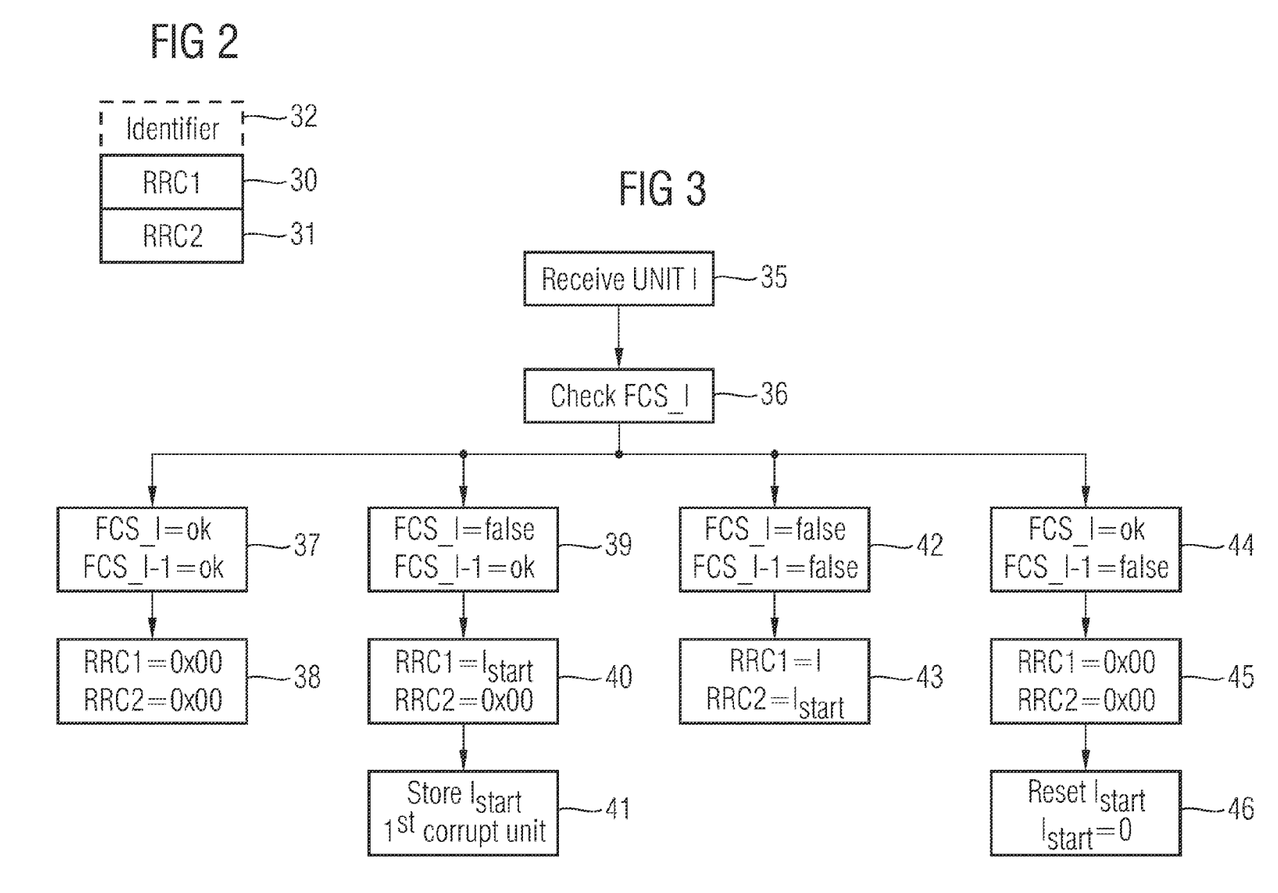
FIG. 2 is a diagram of a retransmission request according to an embodiment.
FIG. 3 is a flow diagram of a method according to an embodiment.

In FIG. 2, an embodiment of a retransmission request is illustrated. Such a retransmission request may for example be sent by retransmission request generator 23 of the embodiment of FIG. 1. The retransmission request according to the embodiment of FIG. 2 comprises a retransmission request channel 1 (RRC1) 30 and a retransmission request channel 2 (RRC2) 31. RRC1 30 and RRC2 31 may, in an embodiment, use different frequency channels or, in another embodiment, may be regarded as two data fields of a retransmission request sent in any adequate manner from a receiver having received corrupt data units to a transmitter of the data units. Optionally and depending on the mechanism of transmission used for the retransmission request in an embodiment, an identifier 32 may be provided to identify the retransmission request as a retransmission request in case it is sent together with other types of data.

According to the embodiment of FIG. 2, RRC1 30 is used for transmitting a sequence ID of a first corrupt data unit of a series of corrupt data units, and RRC2 31 is used for transmitting a current corrupt data unit. By providing not only the sequence ID of the current corrupt data unit, but also of the first corrupt data units of a series of corrupt data units, even if some retransmission requests are corrupted, the full information which data units to retransmit may be communicated to the respective transmitter according to the embodiment, as is explained in the following in greater detail.

FIG. 3 illustrates an embodiment of a flow diagram of a method according to an embodiment for generating retransmission requests in the format of FIG. 2. Such a method may be implemented, in the exemplary embodiment of FIG. 1, in monitoring unit 21 and retransmission request generator 23. Such a method may be implemented as firmware, as dedicated hardware, as software running on a general purpose processor or in any other suitable way in embodiments.

In the embodiment of FIG. 3, as previously explained the data units transmitted have a sequence ID and a checksum. In FIG. 3, the sequence ID is designated "I", and the checksum is labeled "FCS" as above.

At 35, a data unit, for example a frame, having a sequence ID I is received. At 36, the checksum of data unit I, FCS_I, is checked. When the checksum matches the content of the data unit, it is assumed that the unit has been received correctly (this case is labeled "ok" in FIG. 3), and if the checksum does not match the content of the data unit, this is taken as an indication that the data unit has been corrupted (labeled "false") in FIG. 3.

Depending on the result of the check of the checksum in step 36 both for the current data unit I and of the checksum FCS_I−1 of a data unit I−1 preceding data unit I the method of the embodiment of FIG. 3 is continued in one of steps 37-44.

The method is continued at 37 if both the checksum of the current data unit I and the checksum of the preceding data unit I−1 are correct. In this case, at 38 both RRC1 and RRC2 are set to zero indicating that no retransmission is needed. This format where both RRC1 and RRC2 are zero may also be labeled "idle" indicating an idle state, i.e., a state where no retransmission is needed or called an idle flag.

In case the checksum of the current data unit I is not correct or false, but the checksum of the previous data unit I−1 has been correct, the method is continued at 39. This indicates that the current data unit I is the first corrupt data unit after at least one data unit which has been received correctly. In this case, at 40 RRC1 is set to $I_{start}$, $I_{start}$ being equal to I, i.e., the sequence ID of the current data unit. RRC2 is set to zero. A retransmission request having this form may also be called a "start flag" since it indicates the first one in a possible series of corrupted data units. At 41, the sequence ID $I_{start}$ of this first corrupt unit is stored, for example, in a memory.

In case both the checksum of the current data unit I and the checksum of the previous data unit I−1 are not correct or false, the method continues at 42. In this case, at 43 RRC1 is set to I, i.e., the sequence ID of the current data unit, and RRC2 is set to $I_{start}$ which had been stored at 41, i.e., as already explained with reference to FIG. 2 RRC1 is set to the sequence ID of the currently corrupt data unit and RRC2 is set to the sequence ID of the first corrupt data unit. This format of the retransmission request may also be labeled "continue flag" since it indicates a continuing disturbance of the received data units.

Finally, if the checksum of the current data unit I is correct, but the checksum of the previous data unit I−1 was not correct, the method continues at 44. In this case, at 45 both RRC1 and RRC2 are set to zero as at 38. In other words, the resulting retransmission request is the same as in step 38 corresponding to an idle flag. Therefore, an idle flag received after a start flag or a continue flag indicates an end of a series of corrupted data units and, in this case, may also be called "end flag".

At 46, the variable $I_{start}$ is reset and set to zero. Step 46 may be omitted and the value of $I_{start}$ may simply be overwritten at 41 at the beginning of a following sequence of corrupted data packets.

The method in FIG. 3 is repeated for each received data unit.

The above embodiment is only an example of possible embodiments. In particular, the information conveyed by retransmission request 2 may be conveyed in a different format. For example, instead of indicating a current corrupt data unit and a first corrupt data unit of a series, in a different embodiment one of the current corrupt data unit and the first corrupt data unit may be provided together with a total number of corrupt data units in the series, or the content of RRC1 30 and RRC2 31 may be reversed in a different embodiment.

When the transmitter of the corrupt data units, for example transmitter 11 of the embodiment of FIG. 1, receives such retransmission requests, as already mentioned it retransmits the corrupt data units as indicated by the retransmission request. For example, using the retransmission request discussed with reference to FIGS. 2 and 3, the transmitter would retransmit the data units from the data unit having the sequence ID $I_{start}$ up to the last corrupt data units in the respective series.

In some cases, it is not possible to retransmit a specific data unit, for example if the data unit is not in a corresponding buffer of the transmitter like retransmission buffer 14 of FIG. 11 anymore. This may for example be the case if a great number of data units are corrupted in series such that the size of the corresponding buffer in the transmitter is not sufficient to store all these data units simultaneously.

Furthermore, the transmitter in an embodiment may keep track of which data units already have been transmitted.

Figure 4:
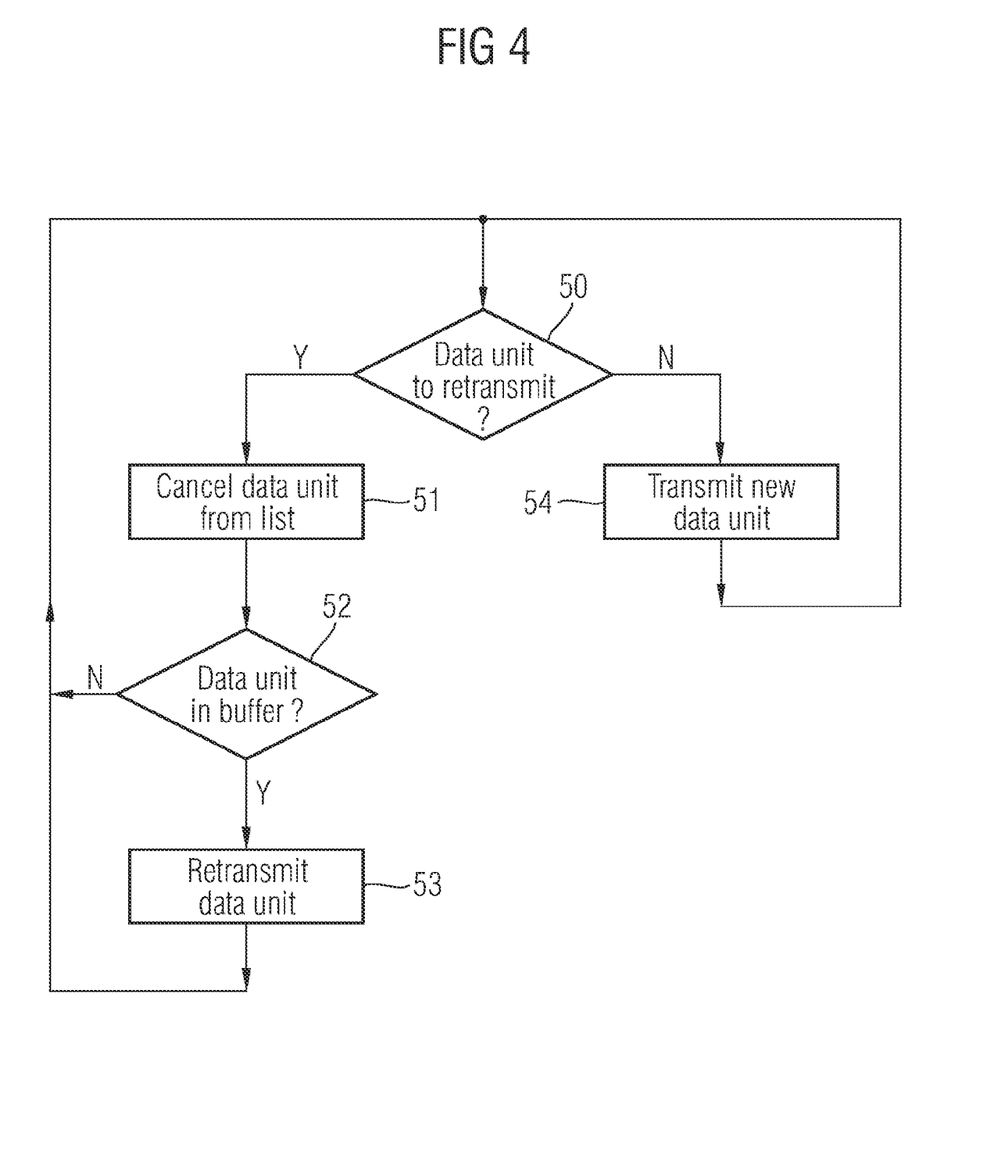
FIG. 4 is a flow diagram of a method according to an embodiment.

In this respect, FIG. 4 illustrates a simplified flow diagram of an embodiment of a method for performing such a retransmission.

For this embodiment, the data units to be retransmitted as indicated by retransmission requests are stored in a "list". This list may be a list in the conventional sense of the word, for example a table containing all the sequence IDs of data units to be retransmitted, or may be implemented in any other suitable manner which enables the transmitter to keep track of which data units have to be retransmitted. For example, in an embodiment, this "list" may comprise, for a series of corrupted data units to be retransmitted, the sequence ID of the first data unit to be retransmitted and the sequence ID of the last data unit to be retransmitted. The sequence ID of the first data unit to be retransmitted is then incremented after each retransmission until it reaches the sequence ID of the last data unit to be retransmitted. Another possibility which is explained below in greater detail is the use of counters or history variables indicating the number of already retransmitted data units.

In the embodiment of FIG. 4, at 50 it is determined whether any data unit has to be retransmitted or, in other words, any data unit is indicated in the list of data units to be retransmitted. If this is not the case, at 54 a new data unit is transmitted, i.e., a data unit which has not been transmitted previously. After that, the method again resumes 50.

If a data unit is to be retransmitted, this data unit (in case of a plurality of data units to be retransmitted, the respective next data unit to be retransmitted) is cancelled from the list, i.e., it is marked in some manner that this data unit has already been treated.

At 52 it is evaluated if this data unit is still in the buffer or memory of the transmitter, i.e., if it is still available for retransmission. If this is not the case, the method is resumed at 50. On the other hand, if the data unit is still available, it is retransmitted at 53 before the resuming the method at 50. In this way, all the requested data units are retransmitted if they are still available, i.e., still stored in the buffer.

In addition to the check whether the data unit is still in the buffer, in other embodiments it is possible to additionally or alternatively use a time limit for retransmission, i.e., retransmit data units only if not more than a predetermined time limit has passed since the original transmission of the data unit.

Next, the timing of an exemplary retransmission according to an embodiment is explained with reference to FIG. 5. Such timing may for example occur in the embodiment of FIG. 1 using the retransmission request as illustrated in FIG. 2. For the timing diagram of FIG. 5, a transmission where data units are transmitted in regular intervals, for example a DMT transmission using frames like in the embodiment of FIG. 1, is assumed. In the first line of FIG. 5, the time is given in units, wherein in each time unit a data unit is transmitted. In the second line, the occurrence of impulses disturbing the transmission and thus corrupting the transmission of the data units is indicated.

In the third line labeled TX:SID the sequence ID of the data unit transmitted is indicated. The fourth line labeled RX:NACK is used for indicating time delays occurring in processing the retransmission requests. The abbreviation NACK in this case stands for non-acknowledgement and indicates that the method according to the embodiment discussed, data packets which have been received corrupted are indicated to the transmitter, but no positive acknowledgement of packets correctly received is made. However, in other embodiments packets correctly received may be explicitly acknowledged.

In lines 5 and 6, the first corrupt sequence ID and the current corrupt sequence ID sent, e.g., in the retransmission request according to the embodiment of FIG. 2 in fields 31 and 30, respectively, are illustrated.

Figure 5:
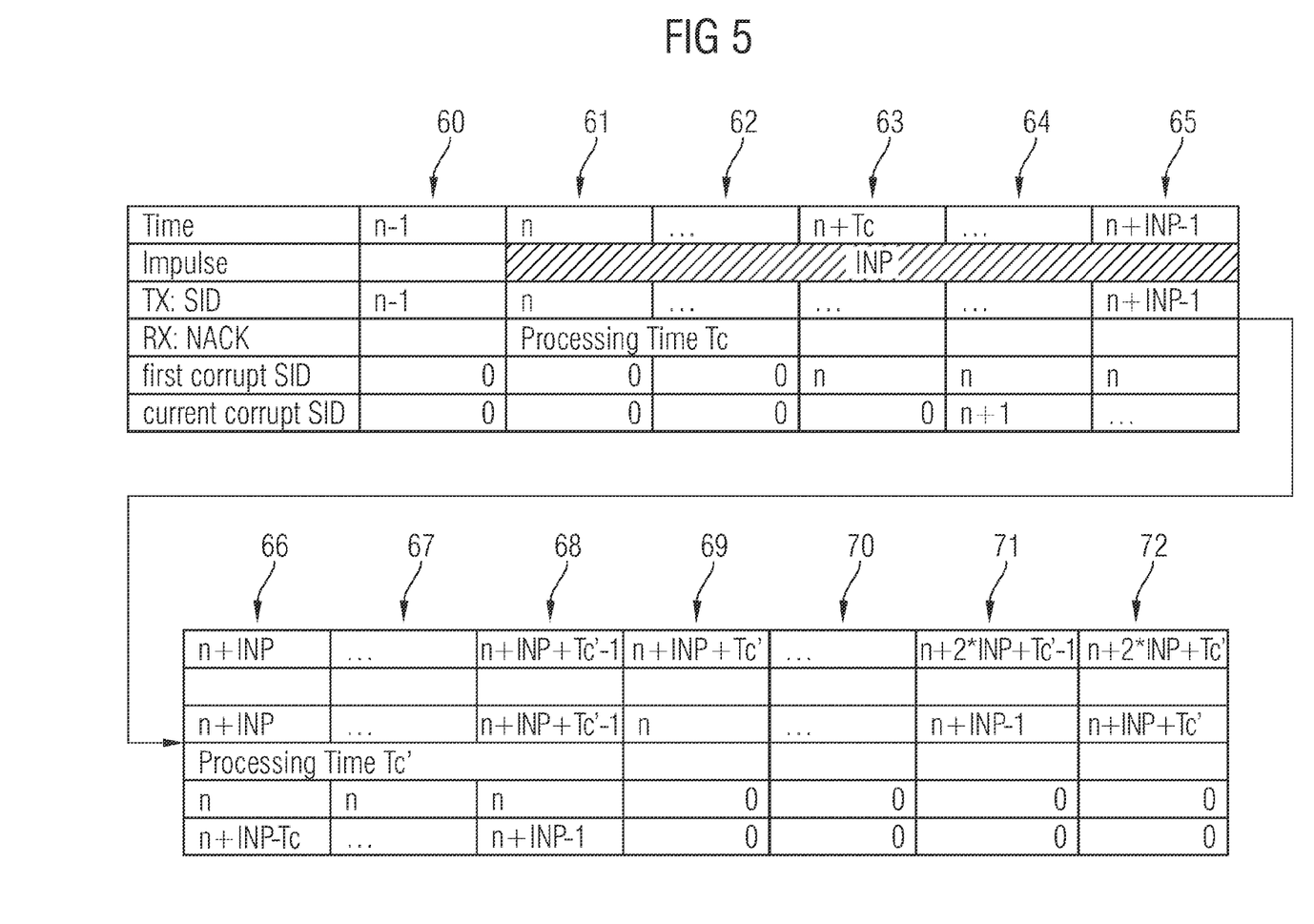
FIG. 5 is a diagram for explaining the operation of embodiments.

The exemplary timing diagram of FIG. 5 starts in column 60 with time step n−1 in which a data unit having the sequence ID n−1 is transmitted. No impulse disturbing the communication is present, and the data unit consequently is received correctly.

In the next time step n of column 61, a disturbing impulse begins having a length INP of a plurality of time units in the example of FIG. 5. As a matter of course, such a disturbing impulse may have any length, wherein in the example of FIG. 1 the length indicates how many data units are corrupted by the impulse and therefore the length may be any integer number starting with 1. Additionally, the impulse also corrupts the retransmission requests sent from the receiver to the transmitter, which for example may occur if both the data units and the retransmission requests are sent over the same physical connection.

The first corrupted data unit in the example illustrated is the data unit with the sequence ID (SID) n sent in time step n in column 61. At the receiver, a processing time Tc passes until the first retransmission request is sent. This processing time Tc comprises the time until data unit with sequence ID n arrives at the receiver and has been evaluated at the receiver to determine that it is corrupted. The time Tc in the example of FIG. 5 is also measured in time units. In column 62 during the passing of the processing time Tc further data units are sent. In time step n+Tc of column 63, the processing time Tc has passed and the first retransmission request is sent comprising, as explained for example with reference to FIG. 3, the first corrupt sequence ID n. In this respect, at this time only data unit n has been detected as being corrupt, since the processing time Tc is needed for the evaluation of every data unit in the embodiment illustrated. In the retransmission request in the following time step, the first corrupt sequence ID n is repeated and sent together with the current corrupt sequence ID, i.e., the sequence of the data unit just evaluated (with the delay of Tc).

As the disturbing impulse continues and, as explained, also acts on the channel used for the retransmission request, these retransmission requests are corrupted. Therefore, in the embodiment illustrated in FIG. 5 the transmitter keeps transmitting new data units since it does not receive a valid, i.e., non-corrupt, retransmission request. The last time step where the disturbing impulse continues is time step n+INP−1, where the data unit with the corresponding sequence ID n+INP−1 is sent and the last corrupt data unit is received.

In the following time step n+INP in column 66, the corresponding data unit having a sequence ID of n+INP is received correctly. In other words, the sequence ID of the last corrupt data unit is n+INP−1. Due to the processing time Tc, in column 66 the current corrupted data unit indicated in the retransmission request is n+INP−Tc. This retransmission request is the first retransmission request which can reach the transmitter uncorrupted since now the impulse has passed.

Until this first non-corrupted retransmission request causes a retransmission of previously sent data units, a processing time Tc' passes comprising the time needed for the retransmission request to reach the transmitter and for the transmitter to process the request. In FIG. 5, Tc' is equal to Tc. However, Tc' and Tc as explained depend on the processing time of the transmitter and the receiver, respectively, and also on the time the actual transmission needs and therefore also may differ from each other.

In column 67, therefore, further data units following the data unit with sequence ID n+INP are sent until, as indicated in column 68, in time step n+INP+Tc'−1 the corresponding data unit with sequence ID n+INP+Tc'−1 is sent. As in the example illustrated Tc is equal to Tc', in this time step also the last retransmission request indicating n as the first corrupt data unit and n+INP−1 as the last corrupt data unit is sent.

In column 69 in time step n+INP+Tc' the processing time Tc' has passed, i.e., the first uncorrupted retransmission request of column 66 has been processed in the transmitter. Therefore, the data unit with the sequence ID n is resent. On the other hand, since no corrupted packets are received anymore, no retransmission requests are sent as indicated by values of zero in the last two lines of column 69.

After time step n+INP+Tc', the corrupted data units are sequentially resent as indicated by column 70 until in step time n+2·INP+Tc'−1 the last corrupted data unit with sequence ID n+INP−1 is resent. After that, in time step n+2·INP+Tc' in column 72, the data unit following the data unit sent in column 68, i.e., the data unit with sequence ID n+INP+Tc', is sent.

While in the example of FIG. 5 during the receipt of corrupted retransmission requests sending of data units is continued at the transmitter in a normal fashion, in other embodiments it is also possible to take the receipt of corrupt retransmission requests as an indication that the line is disturbed and consequently, to interrupt the transmission of data units.

As already indicated with reference to FIG. 4, in an embodiment, some kind of list is maintained at the transmitter to keep track of the data units which already have been resent. Such a list may be implemented by using an internal counter or history variable in the transmitter. A corresponding implementation of a transmitter and in particular a retransmission controller like retransmission controller 16 of FIG. 1 in form of a state machine according to an embodiment is illustrated in FIG. 6.

Figure 6:
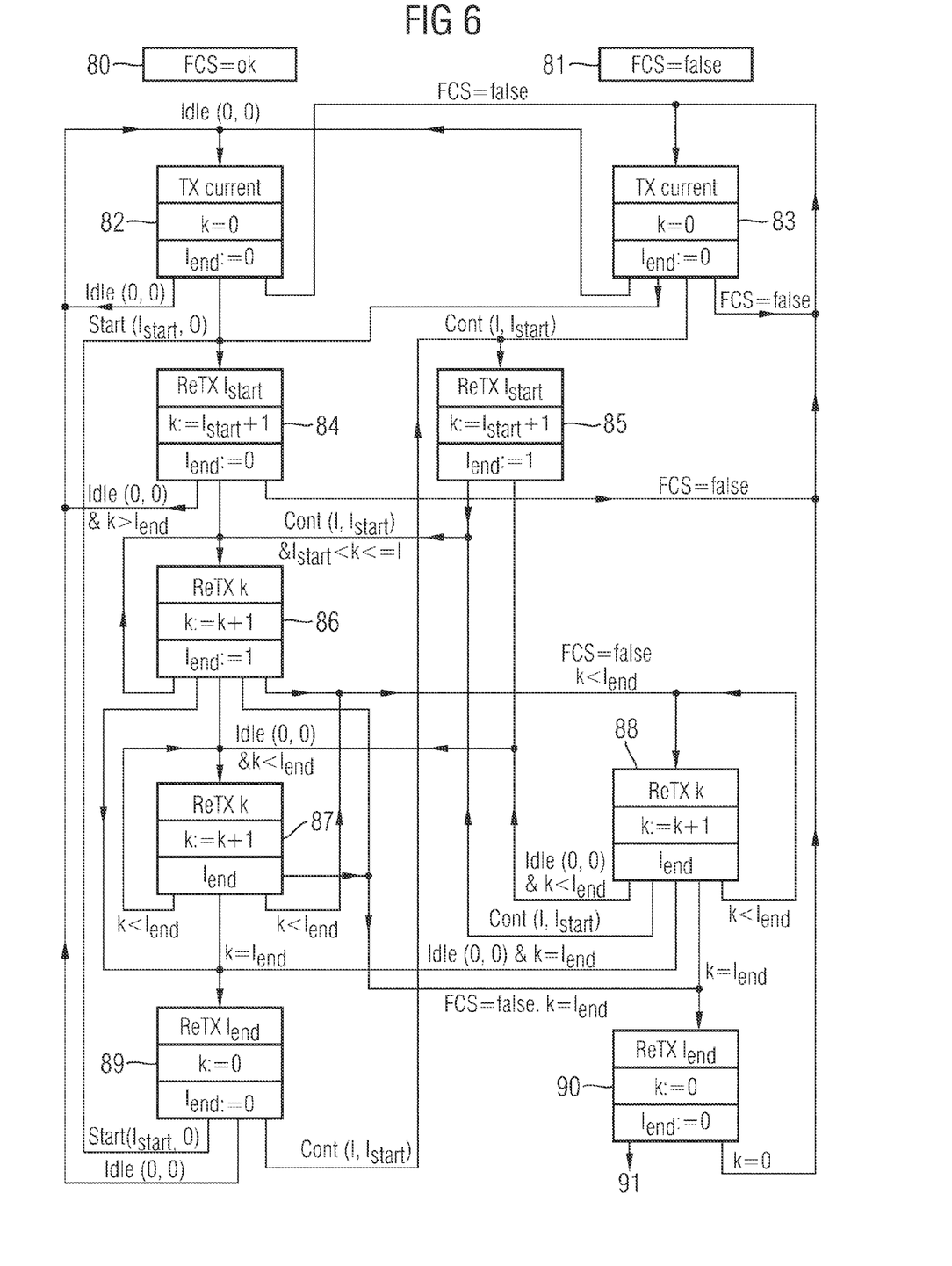
FIG. 6 illustrates a diagram of a state machine according to an embodiment.

The state machine illustrated in FIG. 6 comprises states 82-90. On the left side of FIG. 6 as indicated at 80, states are illustrated which are executed in case a checksum of a retransmission request received by the state machine is correct, i.e., the retransmission request is not corrupted. On the other hand, on the right side of FIG. 6 as indicated at 81, states 83, 88 and 90 are illustrated which are used in case the checksum of a retransmission request to be processed is not correct, i.e., the retransmission request itself is corrupted.

The state machine of the embodiment illustrated in FIG. 6 is adapted to process retransmission requests having the format discussed with reference to FIGS. 2 and 3, i.e., comprising a sequence ID of a current corrupted data unit and of a first corrupted data unit of a series of data units. In FIG. 6, a retransmission request as generated for example at 38 and 45 in the method of FIG. 3 (idle flag) is designated with Idle (0, 0), a retransmission request as generated at 40 in the method of FIG. 3 (start flag) is indicated by Start ($I_{start}$, 0), and a retransmission request as generated at 43 in the method of FIG. 3 (continue flag) is indicated by Cont (I, $I_{start}$).

The states 82-90 in FIG. 6 are depicted with three lines. In the first line, an indication is given which data unit is transmitted in this state. The indication "TX current" indicates that a current data unit, i.e., a new data unit which has not been transmitted previously, is transmitted. The indication "ReTX" followed by a variable indicates that the data unit having the sequence ID indicated by the variable is retransmitted.

In the second line depicted by the state, the treatment of an internal history variable k is given. k serves for keeping track of which data units already have been retransmitted and therefore serves for keeping a "list" in the sense explained with reference to step 51 of FIG. 4.

In the last line of the states, the treatment of an internal end variable $I_{end}$ is given, the variable generally indicating a last data unit to be transmitted according to the received retransmission requests and therefore also serves for keeping track of which data units have to be retransmitted. The representation of the states only serves to indicate which functions are performed in the respective state, and the implementation of these functions may be by software, firmware, hardware, combinations thereof and the like.

In the following, the example states 82-90 and the corresponding state transitions are explained in more detail. State 82 is the state which is active in case of transmission without errors. In this case, idle flags arrive as retransmission requests with correct checksum (since the channel used for transmitting the retransmission requests is also not disturbed in this case), and the current data unit is transmitted. The internal variables k and $I_{end}$ are set to zero. As indicated in FIG. 6, as long as idle flags are received, this state is entered again and again in a loop such that data units are transmitted consecutively. This state, in the exemplary timeline of FIG. 5, would for example be active in column 60.

When transmission errors occur, in the embodiment of FIG. 6 there are two possibilities of leaving state 82. The first possibility is that a start flag is received, i.e., a retransmission request like for example generated in step 40 of FIG. 3. In this case, a state transmission occurs to state 84. In state 84, the data unit with the sequence ID $I_{start}$ is retransmitted, the history variable k is set to $I_{start}+1$ indicating that if required as next data unit the data unit with sequence ID $I_{start}+1$ would be retransmitted, and the end variable is set to $I_{end}=0$. State 84 in particular is assumed (i.e., obtained) if the channel used for transmitting the retransmission request is not disturbed in a manner to corrupt the retransmission request such that, in contrast to the situation of FIG. 5, already the first retransmission request, i.e., the start flag is correctly received.

From state 84, as long as the channel used for the retransmission request is not disturbed, two possibilities exist: an idle flag may be received next. Since in state 84 $I_{end}$ is set to zero and k is set to $I_{start}+1$, k is greater than $I_{end}$ indicating that all data units requested have been retransmitted. In this case, the state machine reverts to state 82. On the other hand, in case of a longer disturbance of transmission, as already explained with reference to FIG. 3 a continue flag indicating the first corrupt data unit (i.e., $I_{start}$) and the current corrupt data unit I will be received. I will be greater than $I_{start}$ since, as explained, the data units are numbered consecutively. Therefore, k will be smaller or equal to I since k has been set to $I_{start}+1$ in state 84. In this case, a transition to state 86 is made. In state 86, the data unit having sequence ID k is retransmitted. After this retransmission, k is incremented by 1, and $I_{end}$ is set to I, i.e., the current corrupted data unit as indicated by the continue flag. As long as further continue flags are received and k is smaller or equal to I of the continue flag, state 86 is assumed again in order to retransmit the next data packet.

When k reaches $I_{end}$ and an idle flag is received, a transition is made from state 86 to state 89 where the data unit with sequence ID $I_{end}$ is transmitted and the variables k and $I_{end}$ are reset to zero. In this state, a series of data units has been completely retransmitted. If, on the other hand, while in state 86 an idle flag is received, but k is still smaller than $I_{end}$, state 87 is assumed where data unit with sequence ID k is retransmitted, k is incremented by 1 and $I_{end}$ is kept constant. This state is assumed repeatedly as long as idle flags are received and k is smaller than $I_{end}$ such that all requested data units are retransmitted. This, for example, corresponds to the situation in FIG. 5 between column 69 and 71.

When k reaches $I_{end}$, the already discussed state 89 is assumed from state 87.

From state 89, if further idle flags are received step 82 is assumed, i.e., the normal undisturbed transmission is resumed, and if a further start flag is received, state 84 is assumed and the above described operations are carried out based on this new start flag. If a continue flag is received in this case, state 85 is assumed which is discussed below.

The states discussed so far are assumed in case the checksum of the retransmission requests received is correct, i.e., the retransmission requests are not corrupted. In the following, the states assumed in case of corrupted retransmission requests are discussed.

In case, starting for example with state 82 representing the normal undisturbed transmission, a corrupted retransmission request is received, state 83 is assumed. In state 83, the same operations are carried out as in state 82, i.e., a current data unit is transmitted, and the variables k and $I_{end}$ are kept at zero. State 83 is assumed repeatedly as long as corrupt retransmission requests are received. As an example, this state for example would be assumed in columns 63-65 of FIG. 5.

When, starting from this state, a (not corrupted) idle flag is received, a transition to state 82 is made. This for example may be the case if only the channel for sending the retransmission requests is disturbed, but not the channel for transmitting the data units. If, while in state 83, a start flag is received, the state machine changes to the already discussed state 84.

If, while in state 83, a continue flag is received, a transition to state 85 is made. This, referring again to the example of FIG. 5, would for example be the case when after the impulse illustrated in FIG. 5 the first non-corrupted retransmission request of column 66 is received. In state 85, the data unit with sequence ID $I_{start}$ is retransmitted, the internal variable k is set to $I_{start}+1$ and $I_{end}$ is set to I of the continue flag. If, starting from this state 85, a further continue flag is received and k is smaller or equal to I, the state machine changes to state 86 which already has been described. If, on the other hand, an idle flag is received, the state machine changes to state 87. Therefore, after state 85 which basically compensates possibly corrupted retransmission requests prior to the continue flag causing the transition to state 85, the further handling is performed like in the already discussed case of no corrupted retransmission requests.

In case the state machine, while in state 86 or 87, receives a corrupted retransmission request while k<$I_{end}$, i.e., not all the requested state units have been retransmitted, state 88 is assumed. In state 88, the data unit with sequence ID k is retransmitted, and k is incremented by 1. This state is repeatedly assumed as long as k<$I_{end}$ and corrupted retransmission requests are received. In case k reaches $I_{end}$ and still corrupted retransmission requests are received, state 90 is assumed. The same state 90 is assumed if, while in state 86 or 87, k is equal to $I_{end}$ and a corrupted retransmission request is received. In state 90, the data unit with the sequence ID $I_{end}$ is transmitted, and the variables k and $I_{end}$ are reset to zero. From state 90, if still corrupted retransmission requests are received, a transition is made to state 83. On the other hand, if a non-corrupted retransmission request is received from state 90, as denoted by reference numeral 91 a transition is made to state 82 if an idle flag is received and to state 84 if a start flag is received.

Referring again to state 88, if in state 88 an idle flag is received and k<$I_{end}$, a transition to state 87 is made. If a continue flag is received, a transition to state 86 is made. If an idle flag is received and k=$I_{end}$, a transition to state 89 is received.

As a matter of course, the state machine according to the embodiment of FIG. 6 is only one possible implementation of a controller for controlling the retransmission like retransmission controller 16 of FIG. 1. In particular, in other embodiments the state machine may be adapted to other formats of the retransmission request, as already mentioned with reference to FIG. 2. Furthermore, in the state machine of FIG. 6 the history variable k is used to keep track of the data units which already have been retransmitted. In a different embodiment, for example the sequence ID of the data units to be retransmitted may be stored in a table and deleted from the table after retransmission.

In the above-described embodiments, the situation may occur where a new disruption or degradation of the transmission, for example by a further impulse, occurs before all the data units corrupted by a current impulse or other events have been retransmitted.

An example for this is if in the embodiment of FIG. 6 while in state 87 which completes the retransmission of the requested data units after the impulse has passed a new start flag relating to the "new" degradation is received. In order to handle such situations, according to an embodiment the sequence ID values of such a start flag and possible continue flag following such a start flag are stored in a memory or table and processed after all data units of the previous degradation have been retransmitted. A further history variable may be used to keep track of a plurality of such stored flags and their processing. In a different embodiment, the situation may be taken into account that a degradation of the channel used for the retransmission requests lasts longer than a degradation of the channel used for transmitting the data units. In this case, it may happen that all non-idle retransmission requests are corrupted and therefore no retransmission is made. In the embodiment, to compensate for this scenario the receiver of the data units may send a retransmission request again if a time based on the processing delays of receiver and transmitter has passed without receiving retransmitted data units.

On the other hand, the channel used for transmitting the data units may be disturbed longer than the channel used for the retransmission requests. In this case, the retransmitted data units may be destroyed. In an embodiment, this is detected by keeping track of the sequence IDs of the retransmitted packets. If the receiver requests, with a retransmission request, a data unit with a sequence ID which has not been sent by the transmitter, this is an indication for the transmitter of this embodiment that retransmitted data units have been lost and have to be sent again.

A choice whether to implement these additional embodiments or use any of the previous described embodiments, for example the embodiment of FIG. 6, may be made based on the likelihood of such scenarios where the channel for transmitting the data unit and the channel used for transmitting the retransmission requests are corrupted for different periods of time, the required reliability of the data transmission, the computing power available, and the latency allowed in a given system.

Further embodiments taking into account a plurality of brief degradations of a channel used for transmitting data units are discussed below with reference to FIGS. 7-9. These embodiments may be for example implemented as modifications of the previously discussed embodiments.

Figure 7:
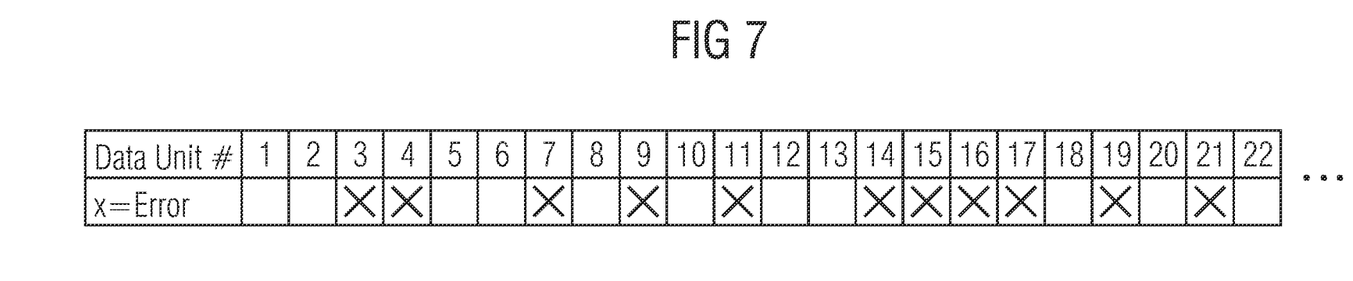
FIG. 7 illustrates a diagram for explaining embodiments.

In FIG. 7, an exemplary degradation of a data unit transmission which will be used for explaining embodiments is illustrated. As a matter of course, this is only to be taken as an exemplary scenario, and the embodiments may be applied to any sequence of corrupted and non-corrupted data units.

In FIG. 7, in the first line the sequence IDs of data units 1-22 are given. In the second line, data units which are corrupted for example by external impulses acting on a corresponding transmission channel are marked with "X". In other words, in the exemplary scenario of FIG. 7, data units 3, 4, 7, 9, 11, 14-17, 19 and 21 are assumed to be corrupted.

Figure 8:
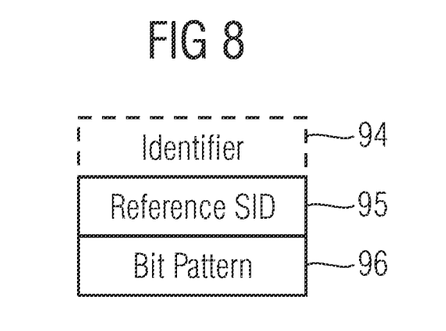
FIG. 8 is a schematic diagram an embodiment of a retransmission request.

In FIG. 8, a retransmission request according to an embodiment is illustrated. The retransmission request of FIG. 8 comprises a reference sequence ID in a field 95 and a bit pattern indicating corrupt data units relative to the reference sequence ID of field 95 in field 96. Such a retransmission request may be used in any of the transmission systems, transmitters and receivers already discussed. For example, it may be transmitted via a dedicated transmission channel, for example using predetermined frequency channels. On the other hand, as already discussed with reference to FIG. 2, if also other information besides the retransmission requests are transmitted over a channel used, an identifier 94 may be added to identify the transmitted information as retransmission request.

As already mentioned, with the bit pattern of field 96 corrupted data units are indicated relative to the data unit indicated in field 95. With such a retransmission request, information regarding a plurality of corrupted data units which may be consecutive or non-consecutive may be transmitted. Similar to the already described embodiments, if one or more of such retransmission requests are corrupted, the information regarding the data units to be retransmitted may be taken from a later non-corrupted retransmission request.

Possible examples and embodiments of the retransmission request of FIG. 8 are given in the following using the exemplary scenario of FIG. 7.

According to an embodiment, the reference sequence ID in field 95 designates a first corrupted data unit, in the scenario of FIG. 7 data unit number 3. The bit pattern in this embodiment then specifies for the data units following the first corrupted data unit whether they are corrupted or not. In case of a 16 bit bit pattern, after the receipt of data unit number 13 in the transmitter, the example bit pattern of the retransmission request is as follows:

$$1001010100000000 \quad (1)$$

In this embodiment, a "1" denotes a corrupt data unit, and a "0" denotes a non-corrupt data unit. In the example (1), the first bit designates the corrupt data unit number 4 followed by the non-corrupt data units 5 and 6 etc. The last six bits in this example (1) would correspond to data units number 14-20 which have not yet been received and are therefore in this example set to zero.

After receipt of data unit 14 which is corrupt, the bit example pattern in this embodiment is as follows:

$$1001010100100000 \quad (2)$$

In this case, the last "1" of the bit pattern has been added to indicate corrupt data unit 14.

In another embodiment, as reference sequence ID in field 95 the sequence ID of the last corrupt symbol received is given. In this case, after data unit number 13 has been received, data unit 11 would be last corrupt symbol, such that a sequence ID of 11 would be sent in field 95 in this embodiment. The example bit pattern according to this embodiment is then as follows:

$$0000000011001010 \quad (3)$$

In this embodiment, the last bit of the bit pattern designates the data unit immediately preceding the data unit used as reference. In the above example where data unit 11 is the last corrupt data unit, the last bit of the above pattern would designate data unit number 10 which is correct, the penultimate bit would designate data unit 9 which is corrupted and so on. In the scenario of FIG. 7, the first six bits of the above pattern (3) are set to zero as they would relate to bits before the start of transmission, i.e., before data unit number 1.

In the same embodiment, after data unit 14 has been received and evaluated, data unit 14 is the last corrupt data unit. In this case, the reference sequence ID of field 95 of the embodiment of FIG. 8 is set to 14. The example corresponding bit pattern is then as follows:

$$0000011001010100 \quad (4)$$

As a matter of course, in other embodiments other data units may be used as reference data units.

In case the relationship between received retransmission requests and sent data units is known, in another embodiment only a bit pattern and no reference sequence ID is sent. This for example may be the case if both data units and retransmission requests are sent data unit by data unit, for example, block by block or frame by frame, with constant transmission times and also the processing delays of the receiver and transmitter are known. In this case, each received retransmission request may be attributed to a specific sent data unit, the sequence ID of which is then taken as reference sequence ID. Such a relationship may for example be determined during an initialization phase of the transmission by sending data units with a sequence ID and returning the sequence ID of the sent data units as retransmission requests such that the transmitter may determine how much time after transmitting a data unit with a sequence ID the corresponding retransmission requests arrives. In this case, according to an embodiment, the example bit pattern after received data unit number 13 the scenario of FIG. 7 is as follows:

$$0000011001010100 \quad (5)$$

This embodiment, the last bit of the bit pattern corresponds to the data unit the retransmission request relates to, in this case data unit number 13. The penultimate bit then corresponds to data unit 12 etc.

After receipt of data unit number 14, the example bit pattern of the corresponding retransmission request according to this embodiment is as follows:

$$0000110010101001 \quad (6)$$

As a matter of course, the above embodiments are only an example. For example, the order of the bits of the above bit pattern could be reversed in a different embodiment.

In other embodiments, a compression algorithm is used to compress the bit patterns. For this, any suitable compression algorithm may be used.

Figure 9:
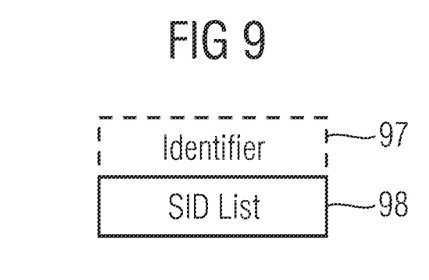
FIG. 9 is a schematic diagram of another embodiment of a retransmission request.

FIG. 9 illustrates an alternative embodiment to FIG. 8. Instead of using a reference sequence ID and a bit pattern, in the retransmission request according to the embodiment of FIG. 9 in field 89 a list of sequence IDs of data units to be retransmitted is provided. An identifier 97 having the same function as identifier 94 of FIG. 8 may be optionally provided. Providing a list of sequence IDs basically conveys the same information as a reference sequence ID together with a bit pattern.

In embodiments of the invention, the length of the bit pattern or the number of sequence IDs in the sequence ID list 98 may be chosen to be any desirable number. As mentioned with respect to FIG. 1, the transmitter according to an embodiment comprises a retransmission buffer for storing data units to be later used for retransmission. The number of bits in the bit pattern or the number of sequence IDs in the sequence ID list 98 may be adapted to the capacity of the retransmission buffer, i.e., the number of data units which may be stored in the retransmission buffer. In other embodiments, the number of bits of bit pattern 96 or of sequence IDs in sequence ID list 98 may be limited by the specific application. For example, in some real time applications the data units may have to arrive within a predetermined time, and the bit patterns and sequence ID list may be adapted to that time in order not to request retransmission of data units which would not arrive within the predetermined time even if sent immediately after the retransmission request is received by the transmitter.

As already mentioned, in exemplary patterns (1) and (2) illustrated above the last bits relate to data units which have not yet been sent and therefore are set to zero in the above-explained embodiment. In another embodiment, such bit patterns may be used to request retransmission of data units which have not yet been sent. As a matter of course, it is also possible, in other embodiments, to extend other bit patterns like example bit patterns (3) to (6) to include bits designating data units which have not yet been sent. In other embodiments, sequence IDs of such future data units are included in a sequence ID list like sequence ID list 98 of FIG. 9.

In embodiments, such a retransmission request for future data units is made if a periodic corruption of data units is detected. For example, if the receiver detects that every fifth data unit is corrupted, it may request retransmission of the corresponding data units in advance. Such periodic corruptions may be caused for example by electronic devices like dimmers or motors which emit impulses with a certain inherent frequency which may be based on the frequency of an electricity distribution network.

In another embodiment, the transmitter examines the bit patterns or sequence ID lists sent by the receiver in its retransmission requests in order to detect periodic corruptions. In such a case in an embodiment the transmitter retransmits the corresponding data units subject to these periodic corruptions without waiting for an explicit retransmission request of the receiver.

This handling of retransmissions prior to transmitting or receiving the corresponding data units in embodiments may also be employed independent of retransmission requests for already received data units.

The handling of the retransmission requests explained with reference to FIGS. 7-9 may be implemented in a similar manner like explained previously with reference to FIGS. 1-6. For example, the same transmission system 10 embodiment as illustrated in FIG. 1 may basically be used, wherein the retransmission request generator 23 and the retransmission controller 16 are adapted, for example by providing them with corresponding programming, to generate and handle retransmission requests as described above with reference to FIGS. 7-9. In case of the embodiment of FIG. 4, the "list" of data units to be retransmitted would comprise the data units marked as corrupt in the bit pattern and in the reference sequence IDs or in the sequence ID list 98 of FIG. 9 in an embodiment. In another embodiment, a state machine similar to the one in FIG. 6 may be used for handling the retransmission requests explained with reference to FIGS. 8 and 9. For example, in an embodiment the sequence IDs of the data units marked as erroneous in the bit pattern of FIG. 9 may be stored in a memory and numbered consecutively with auxiliary numbers starting with 1. For example, in example bit pattern (1), data unit 3 would be labeled with auxiliary number 1, data unit 4 with auxiliary number 2, data unit 7 with auxiliary number 3, data unit 9 with auxiliary number 4 etc. Based on these auxiliary numbers, basically the same state machine as illustrated in FIG. 6 could be employed, wherein $I_{end}$ would be set to the highest auxiliary number and the history variable k would indicate the auxiliary number of the next data unit to be retransmitted.

In FIG. 1, an embodiment has been illustrated relating to DSL transmission. As already mentioned, other embodiments may employ the principles outlined above in other communication environments where the data units may be frames, cells, packets, blocks, symbols etc. For example, embodiments may be employed with any sequential data stream where sequence numbers are applied to the data units of the data stream.

As already mentioned, embodiments may be implemented together with error protection techniques like Reed-Solomon coding and interleaving or without such additional techniques. The choice of the techniques used may be made based on the grade of error protection needed for a specific application in embodiments.

In FIG. 1, the retransmission mechanism is implemented "below" an interleaver i.e., downstream of an interleaver in the transmitter and upstream of a deinterleaver in the receiver. This is one example of an implementation in the physical layer or layer 1 according to the OSI layer model. However, in other embodiments the retransmission mechanism may be implemented in other layers.

In the embodiments described above, a checksum is used to determine whether a received data unit is corrupt. In other embodiments, other methods are additionally or alternatively employed. For example, based on a trellis code and/or on a feed-forward error correction like Reed-Solomon coding, in embodiments corrupt data units are determined or estimated. In other embodiments, properties of an analog signal received at a receiver are used, for example whether a signal has been "clipped", i.e., limited in amplitude by technical constraints like the capabilities of an amplifier on the transmitter's side.

Furthermore, in some of the embodiments described corrupt data units were identified in retransmission request using sequence IDs. In other embodiments, the transmitted data units are numbered consecutively with a data unit number, which may be a cyclic number. This data unit number is then used in the retransmission request. In an embodiment using both sequence IDs and data unit numbers, a retransmitted data unit would carry the same sequence ID as the original (corrupt) data unit, but its own data unit number.

In an embodiment where retransmission requests are also sent on a data unit-by-data unit basis like in the embodiment described above where only a bit pattern and no sequence ID is set, the retransmission requests may also be numbered consecutively. In such an embodiment, for example a retransmission request sent responsive to the receipt of a received data unit bears the same data unit number as the received data unit or a data unit number having a predetermined relationship therewith. In this case, corrupt data units in embodiments may be identified by the difference between their data unit number and the data unit number of the retransmission request.

As already mentioned, any functional unit or component illustrated in the drawings and explained above may be implemented in hardware, in software running on a platform or in a combination thereof (including for example firmware), it being understood that all such embodiments can be comprised by the present invention as it is defined in the appended claims.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of transmitting data, comprising:
   transmitting a series of data units;
   receiving retransmission requests indicating at least one data unit in the transmitted series of data units as a corrupt data unit which was not received correctly;
   analyzing the retransmission requests to detect a periodic pattern according to which pattern corrupt data units occur periodically; and
   transmitting and retransmitting further data units corresponding to the periodic pattern, the retransmission being independent of retransmission requests for the respective data units corresponding to the further data units.

2. The method of claim 1,
   wherein at least some of the retransmission requests indicate a plurality of corrupt data units in the transmitted data units which were not received correctly wherein one of the at least some of the retransmission requests indicates all data units of another one of the retransmission requests and at least one additional data, and
   wherein the method further comprises:
   retransmitting data units corresponding to the corrupt data units.

3. The method according to claim 1, wherein the transmitting comprises providing each data unit with an identifier.

4. The method according to claim 3, wherein the retransmission request comprises an identifier of a first one of the plurality of corrupt data units and an identifier of a last one of the plurality of corrupt data units.

5. The method according to claim 3, wherein the retransmission request comprises an identifier of one of the data units and information indicating the corrupt data units relative to the one data unit.

6. The method according to claim 5, wherein the information comprises a bit pattern.

7. The method according to claim 1, further comprising:
   forming the data units by interleaving,
   wherein the receiving and retransmitting are performed downstream of the interleaving.

8. The method according to claim 1, wherein the data units are one of discrete multi-tone modulated data units and orthogonal frequency division multiplex data units.

9. A data transmitter comprising:
   a transmission circuit configured to transmit a series of data units;
   a receiver circuit configured to receive retransmission requests indicating at least one data unit in the transmitted series of data units as a corrupt data unit which was not received correctly; and
   a retransmission control circuit configured to analyze the retransmission requests to detect a periodic pattern according to which pattern corrupt data units occur periodically, and
   to control the transmission circuit to transmit and retransmit further data units corresponding to the periodic pattern, the retransmission being independent of retransmission requests for the respective data units corresponding to the further data units.

10. The data transmitter according to claim 9, wherein the transmission circuit is configured to provide each data unit with an identifier.

11. The data transmitter according to claim 10, wherein the retransmission request comprises an identifier of a first one of the plurality of corrupt data units and an identifier of a last one of the plurality of corrupt data units.

12. The data transmitter according to claim 10, wherein the retransmission request comprises an identifier of one of the data units and information indicating the corrupt data units relative to the one data unit.

13. The data transmitter according to claim 12, wherein the information comprises a bit pattern.

14. The data transmitter according to claim 9, wherein the retransmission control circuit comprises a state machine.

15. The data transmitter according to claim 14, wherein the state machine assumes first states if retransmission requests are received correctly and assumes second states if corrupt retransmission requests are received.

16. The data transmitter according to claim 14, wherein states of the state machine update a variable after each retransmitted corrupt data unit, the variable indicating which corrupt data units have been retransmitted.

17. The data transmitter according to claim 9, wherein the transmission circuit comprises an interleaver, wherein the retransmission control circuit is configured to control the transmission circuit downstream of the interleaver.

18. The data transmitter according to claim 9, wherein the transmission circuit comprises one of a discrete multi-tone modulator and an orthogonal frequency division multiplex modulator.

* * * * *